United States Patent [19]

Thompson et al.

[11] Patent Number: 4,620,281
[45] Date of Patent: Oct. 28, 1986

[54] IN-PROCESS CUTTING TOOL CONDITION COMPENSATION AND PART INSPECTION

[75] Inventors: Robert A. Thompson, Quaker Street; Richard W. Breuning, Scotia, both of N.Y.

[73] Assignee: General Electric Company, Schenectady, N.Y.

[21] Appl. No.: 580,316

[22] Filed: Feb. 15, 1984

Related U.S. Application Data

[63] Continuation-in-part of Ser. No. 304,495, Sep. 22, 1981, abandoned.

[51] Int. Cl.$^4$ .............................................. G05B 19/24
[52] U.S. Cl. ..................... 364/475; 364/170; 364/551; 318/565; 318/572; 318/632; 73/104; 73/661; 340/680
[58] Field of Search ............... 364/474, 475, 167, 168, 364/170, 550, 551; 318/565, 572, 632; 340/679, 680; 73/104, 660, 661; 324/61 P

[56] References Cited

U.S. PATENT DOCUMENTS

| | | | |
|---|---|---|---|
| 3,400,331 | 9/1968 | Harris | 324/61 P |
| 3,628,002 | 12/1971 | Meese et al. | 364/170 |
| 3,889,206 | 6/1976 | Stoferle et al. | 73/37.5 |
| 4,118,871 | 10/1978 | Kirkham | 364/560 |
| 4,176,396 | 11/1979 | Howatt | 364/474 |
| 4,207,567 | 6/1980 | Juengel et al. | 340/680 |
| 4,214,191 | 7/1980 | Watanabe et al. | 318/572 |
| 4,246,577 | 1/1981 | Shima et al. | 340/680 |
| 4,296,364 | 10/1981 | Fukuyama et al. | 364/474 |
| 4,370,721 | 1/1983 | Berenberg et al. | 364/170 |
| 4,382,215 | 5/1983 | Barlow et al. | 364/474 |

FOREIGN PATENT DOCUMENTS

904730 8/1962 Fed. Rep. of Germany ........ 82/2 B

*Primary Examiner*—Jerry Smith
*Assistant Examiner*—John R. Lastova
*Attorney, Agent, or Firm*—Donald R. Campbell; James C. Davis, Jr.; Paul R. Webb, II

[57] ABSTRACT

The condition of the cutting tool is monitored during a turning operation and the machine is adjusted to compensate for tool condition. The device is also used as an in-process part inspection system. A probe on the cutting tool-tool holder assembly measures the distance to the freshly cut surface and the probe signal is monitored; when this distance changes indicating tool nose wear, the numerical control is alerted to adjust the tool during the chip-forming operation to compensate for wear. A broken or worn-out tool signal shuts down the machine. After a cutting pass the part is inspected by retracting the cutting tool and running the part program. There is an error in the part when the probe signal and thus the measured distance is not constant.

6 Claims, 12 Drawing Figures

Fig. 3 — PART PROGRAM

Fig. 4 — OUT OF CONTACT TOOL PASS

Fig. 5 — PART ERROR

IN-PROCESS CUTTING TOOL CONDITION COMPENSATION AND PART INSPECTION

The Government has rights to this invention pursuant to Contract No. F33615-80-C-5057 awarded to the Air Force.

RELATED APPLICATION

This is a continuation-in-part of Ser. No. 304,495, filed Sept. 22, 1981 and now abandoned.

BACKGROUND OF THE INVENTION

This invention relates to an improved method of monitoring a cutting tool during a machining operation and compensating for tool wear and breakage, and to in-process part inspection using the same system.

In existing machining operations a numerical control directs the path of the tool as it executes the part program. However, if due to tool wear or breakage the locus of the tool point changes, the control has no way of knowing the change has occurred and the resulting part geometry is different than that specified by the part program. Thus costly inspections and rework must be performed to bring the finished part within specifications.

At present, parts are inspected by hand gaging on the machine or are removed from the machine tool and installed in a separate fixture for inspection. This costly operation could be avoided if the part was inspected while still on the machine tool.

SUMMARY OF THE INVENTION

Dynamic in-process inspection of the cutting tool is performed with a displacement sensor which is typically mounted on the cutting tool-tool holder assembly and measures the distance from a fixed point on the tool to the freshly cut workpiece surface during a cutting operation. The same device is used for in-process part inspection; in either instance the probe signal is monitored. When the cutting tool wears the sensed distance decreases an amount identical to the extent of wear. If there is tool breakage the sensed distance changes abruptly corresponding to the depth of cut, and when the prescribed limits of normal wear are exceeded and the tool is worn-out, the sensed distance is less than a reference level.

An in-process method of monitoring the cutting tool and compensating for tool condition comprises continuously measuring the distance to the freshly cut surface and generating a probe signal representing sensed distance. The probe signal is processed to produce tool condition output signals including a wear signal which indicates the amount of tool wear perpendicular to the workpiece axis, and the cutting tool is adjusted during the cutting and chip-forming operation to compensate for the tool condition and return the tool point to its proper location. The numerical control uses the wear signal information to change the part program to compensate for wear. A broken tool signal or wornout tool signal shuts down the system.

To inspect the part after a cutting pass, the cutting tool is retracted a short distance and the part program is re-executed while monitoring the probe signal. If the probe signal is constant the part is identical to the programmed tool path. When the probe signal varies the part is in error relative to the part program. Based on the part error the part program is automatically modified to remachine the part to the desired shape; this procedure may be continued iteratively.

The displacement sensor is a distance gaging device such as an air gage or capacitance gage. The tool condition monitoring system further has means for processing the probe signal comprised of a wear signal circuit, broken tool logic, and worn-out tool logic; an alarm to signal the operator may be operated by the last two. A tool condition monitoring and part inspection system additionally has inspection logic for deriving the part error which may be presented to the numerical control.

DESCRIPTION OF THE PREFERRED EMBODIMENTS

Figure 1:
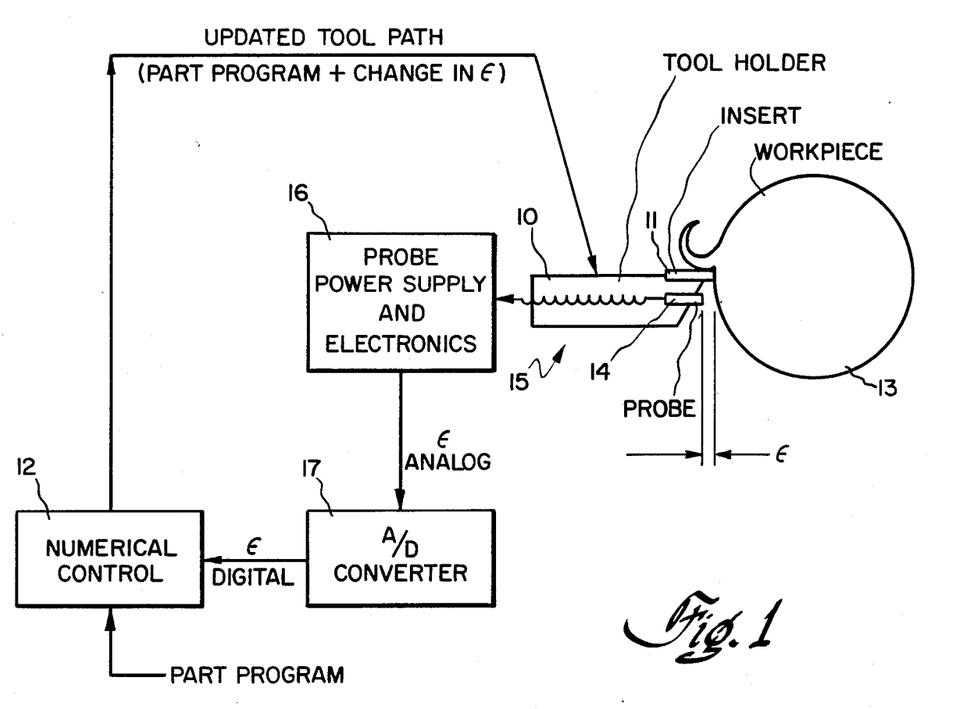
FIG. 1 is a sketch and block diagram of the in-process tool condition compensation and part inspection device operating in the tool wear compensation mode.

In FIG. 1 only the components of a conventional numerically controlled lathe which are needed to understand the invention are shown, and these are the tool holder 10, replaceable cutting insert 11, and numerical control 12 which automatically controls operation of the machine tool. The path of cutting insert 11 follows the NC part program and the workpiece 13 is machined to have a predetermined shape. The numerically controlled machine tool is modified to have a tool condition compensation and part inspection device; operation in the tool wear compensation mode is illustrated. The sensor portion of the device is a probe 14 which can be located at any desired position on the machine tool relative to the cutting insert 11. This displacement sensor 14 is preferably mounted on the cutting tool-tool holder assembly 15 as close to the cutting point as possible, or on the tool holder 10, just below the cutting insert, or it may be incorporated in the insert itself. The probe measures the distance $\epsilon$ from a fixed point on the cutting tool-tool holder assembly to the freshly cut surface of workpiece 13 during a machining operation. The primary output of probe 14 is converted in the electronics of a probe power supply and electronics unit 16 to an analog voltage which is directly proportional to $\epsilon$. This signal is fed into an analog to digital converter 17 and the resulting digital signal is presented to the numerical control unit. When the tool wears $\epsilon$ decreases an amount identical to the extent of the wear. The numerical control 12 is alerted and uses the information to change the part program to compensate for the tool condition. Logic in the numerical control changes the tool path accordingly and returns the tool point to its proper, programmed location. The updated tool path is what is called for by the part program plus the change in $\epsilon$.

A key element in the system is the displacement sensor 14. The probe and probe electronic system can be based on several commercially available distance gaging devices. Key among these in order of their viability as in-process sensors are the air gage, the capacitance gage, the inductance gage, and optical and contact gages. The air gage is the first choice because it can operate linearly over the needed range and has the desired sensitivity, its probe is a small orifice and can therefore be located very near the cutting point, its operating pressure flushes oil and other material from the probe's air gap, it is insensitive to transients like small chips passing through the air gap, and it is durable and inexpensive. One suitable air gage is discussed later (see FIG. 6). The second choice is the capacitance gage. It has the desired sensitivity, it is insensitive to the material properties of the part and to temperature, and it is simple. There are some potential difficulties with capacitance gages, and these are brought out later in the discussion of the air flushed capacitance gage in FIG. 7. With regard to other distance gaging devices, inductance gages are sensitive to the material properties of the part, optical gages are sensitive to dirt, etc., and contact gages wear.

Figure 2:
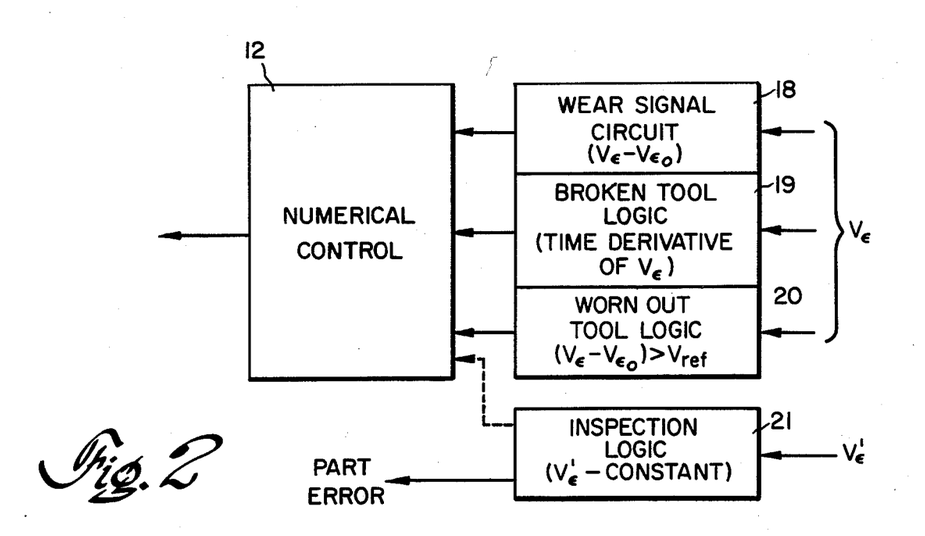
FIG. 2 is a detailed block diagram of logic to detect wear, breakage and a worn-out tool, and to inspect the part.

In the tool wear compensation mode the numerical control part program is updated about once per second to adjust the position of cutting tool 11 by an amount equal to the change in the sensed distance $\epsilon$. Other modes of tool condition compensation are depicted in FIG. 2. If the tool tip breaks during the cut, the sensed distance $\epsilon$ changes abruptly corresponding to the change in depth of cut due to the breakage. Control logic senses the abrupt change and shuts the system down. Worn-out tool logic also detects when $\epsilon$ exceeds prescribed limits due to normal wear and accordingly shuts the system down for tool change. A wear signal circuit 18, broken tool logic 19, and worn-out tool logic 20 are normally implemented with a microprocessor and may be considered to be part of the numerical control unit. The wear signal circuit continuously calculates the difference between the present probe signal amplitude, $V_\epsilon$, and the initial probe signal, $V_{\epsilon o}$. Changes in the numerical control logic to perform the tool condition compensation and part inspection functions are relatively simple and can be made by reprogramming controls such as the General Electric 1050 series numerical control. Those skilled in the art understand how to utilize the wear signal information and offset the tool path to compensate for wear: more detail on this is given later.

The broken tool logic 19 takes the time derivative of probe signal $V_\epsilon$, and the presence of an output larger than a reference level indicates a broken or badly chipped cutting tool. Worn-out tool logic 20 continuously calculates the difference between the present and initial probe signal amplitudes, $V_\epsilon - V_{\epsilon o}$, and compares this difference with a preset reference level, $V_{ref}$. A broken tool or worn-out tool output causes the numerical control 12 to stop the machine tool which is restarted after the cutting insert 11 is replaced. The operator may be alerted by an audible or visual alarm.

Figure 3:
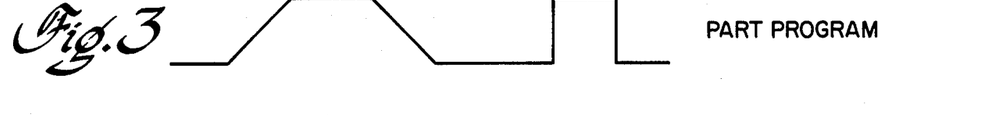
FIGS. 3-5 relate to part inspection and illustrate the numerical control program, an out of contact tool pass, and the probe signal.
Figure 4:
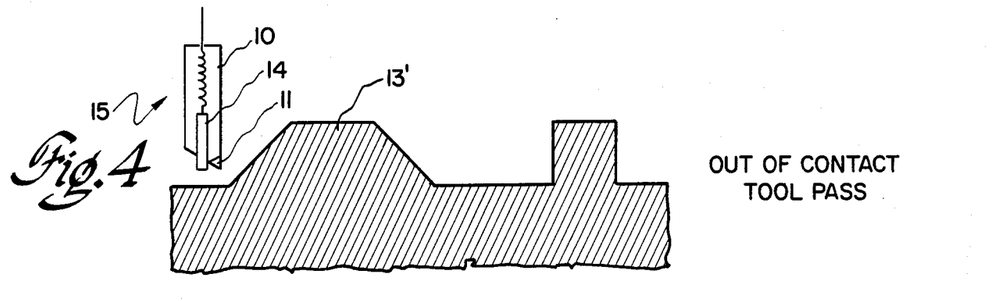
Figure 5:
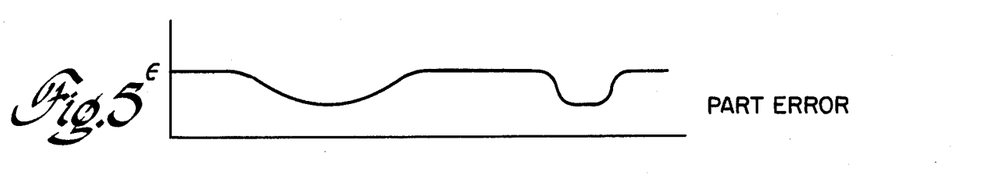

Turning to FIGS. 3-5, the same probe 14 is used to inspect the part after a cutting task by pulling the tool a few mils out of contact with the work and then running the tool through the part program while monitoring the probe signal. If the probe signal remains constant the part is identical to the programmed tool path. If, on the other hand, the probe signal varies during the tool pass, the part is in error relative to the part program and corrective action is needed according to the variance of the probe signal. FIG. 3 shows a sample part program, and in FIG. 4 the cutting tool-tool holder assembly 15 is retracted a few mils away from the machined part 13' and the part program is re-executed. The probe signal $V_\epsilon'$ is fed to the inspection logic 21, FIG. 2, which derives the part error by subtracting a constant from the probe signal $V_\epsilon'$. In FIG. 5 the sensed distance $\epsilon$ is not constant and the part is rejected. The part error may be printed out or otherwise displayed to the operator, but is preferably fed directly to numerical control 12 where the part program is changed to rework the part if the part can be saved.

Figure 6:
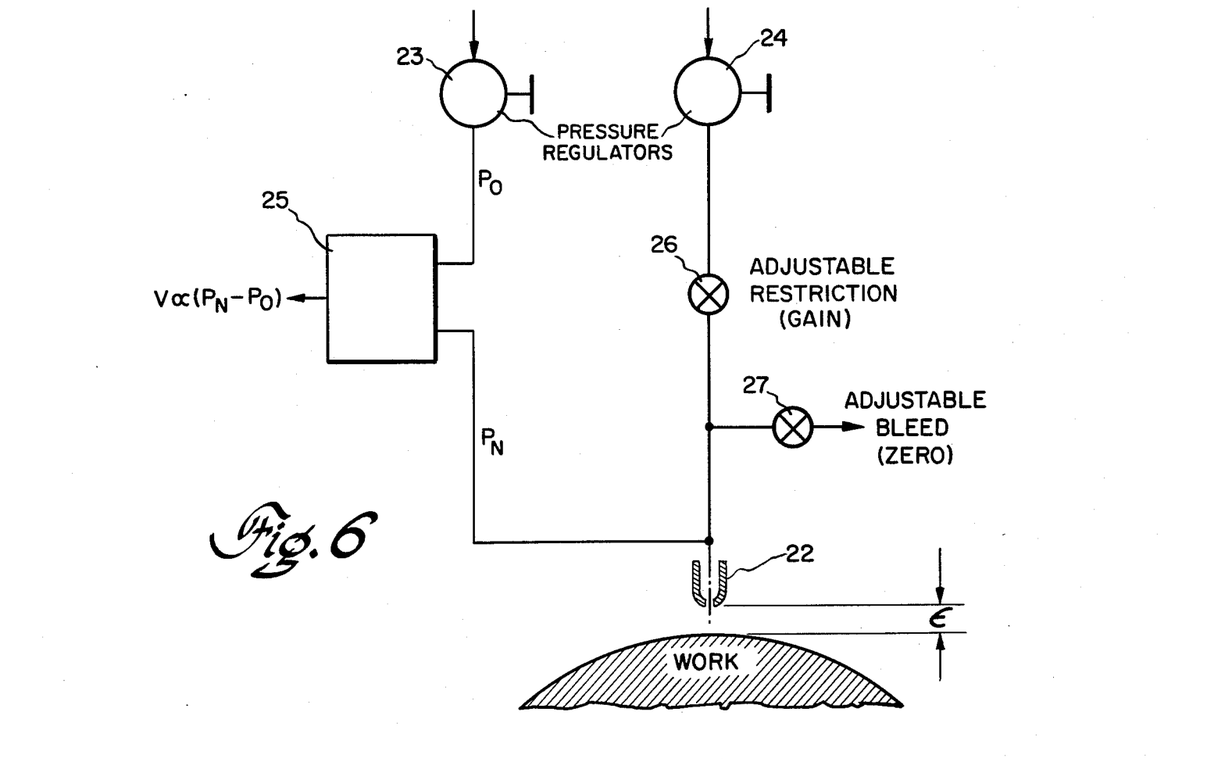
FIG. 6 is a line diagram of a distance measuring air gage.
Figures 7, 10:
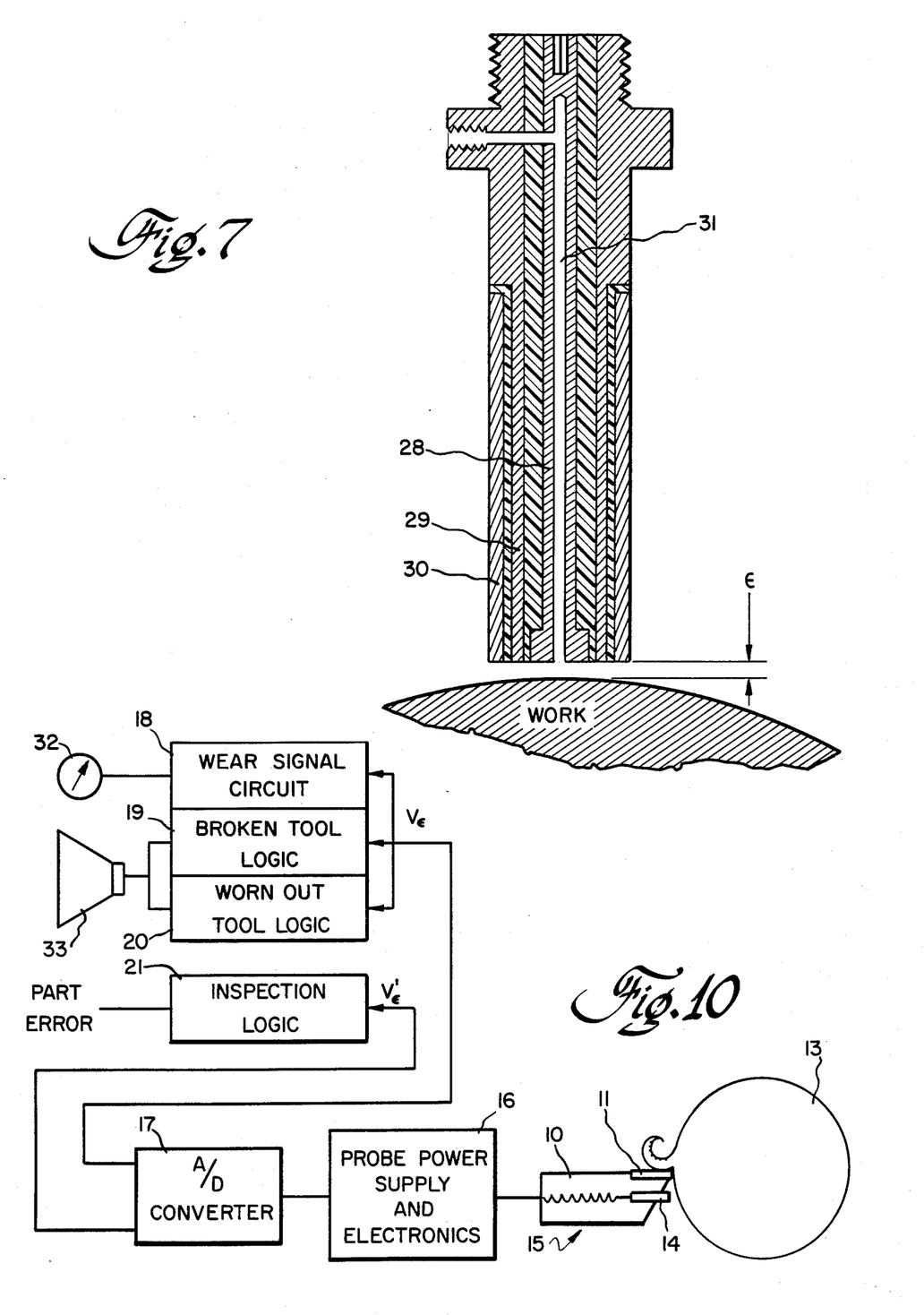
FIG. 7 is a cross section through an air flushed capacitance gage.
FIG. 10 is a sketch and block diagram of a cutting tool and part inspection system which provides operator warnings and outputs.

Two specific displacement sensors, the first an air gage and the second an air flushed capacitance gage, are shown in FIGS. 6 and 7. The air gage is best because it can operate linearly over a range of 12 mils with 0.1 mil sensitivity. Its probe, a 0.078 inch diameter or smaller orifice, is very small and can therefore be located very near the cutting point. Other advantages have already been given. The air gage in FIG. 6 is a modification of the Trendsetter ® unit sold by the Edmunds Gage Company of Farmington, Conn. The modification involves upping the pressure to gaging nozzle 22 to 65 psi or higher and operating with a 2 mm (0.078 inch) orifice. Line air at 80-100 psi is supplied to two pressure regulators 23 and 24. At the output of the first is air at a fixed pressure of 50 psi; this is the reference pressure $P_o$ at one input of a differential pressure integrated circuit chip 25. Pressure regulator 24 feeds air at a fixed pressure of, say, 65 psi to a valve 26 which is an adjustable restriction and controls the gain. Valve 27 is an adjustable bleed and changes the set point of the air going to nozzle 22. The gage is set up to operate in the range where there is a linear relationship between the nozzle pressure $P_N$ and measured distance $\epsilon$, and the reference pressure $P_o$ is at about the middle of this range. The nozzle pressure $P_N$ is high when $\epsilon$ is small and decreases linearly as $\epsilon$ increases. The probe voltage V at the output of differential pressure chip 25 is proportional to $P_N - P_o$. The range of $\epsilon$ is approximately 0.002 to 0.012 inches.

The capacitance gage has the desired sensitivity (10 mil range and 0.1 mil sensitivity) and other good features, but there are a couple of potential difficulties with capacitance gages. First, their output depends on the material in the gap between the probe face and the part. A 2 to 1 change in the probe output will occur if oil replaces air in the gap. In anticipation of this problem, the gage is modified to have a hole drilled through the center of the probe and appropriately connected to a high pressure air or oil supply to continuously flush the gap. The probe calibration is changed to compensate for the material used to flush the gap so that the output of the system is always the same for a given value of $\epsilon$. Another potential problem with the capacitance probe is short circuiting due to small chips entering the gap; this causes an undesirable transient in the probe output.

The air flushed capacitance probe in FIG. 7 has an inner electrode 28, outer electrode 29, and metal shield 30 separated by insulating layers. The inner electrode 28 is provided with a central bore 31 which connects at the top to another passage and the air supply. The gage measures the capacitance between the face of inner electrode 28 and the part, which changes as the separation between the face of the probe and the workpiece changes. Outer electrode 29 is held at a constant voltage and confines the electric field. Tests have shown that this capacitive probe generally has a steady signal, but that the probe signal has occasional spikes as microchips are carried through the probe gap causing impulsive shorting of the probe. Further, the physical dimensions of the probe (approximately 0.5 cm diameter) are such as to somewhat inhibit its ability to measure events occurring precisely under the cutting point.

Figure 11:
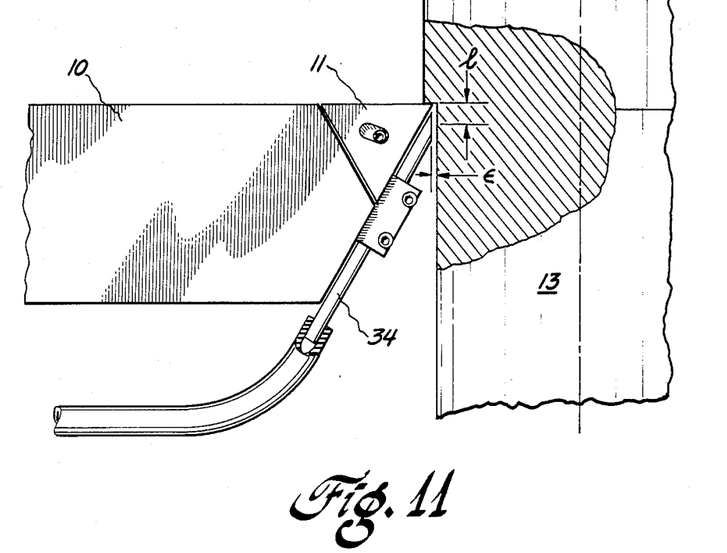
FIG. 11 is a top view of the cutting tool and air gage instrumentation.

One automatic tool wear compensation system is explained in detail to give information on the software needed to convert tool wear information into position commands for the machine. FIG. 11 is another view of the air gage instrumentation and emphasizes that it is tool nose wear (not flank wear) that is measured, or the wear perpendicular to the workpiece axis. The nozzle of air gage 34 is at the level of the triangular insert tip and trails the tip (by 0.120" in laboratory tests). The machine was a vertical turret lathe which had a General Electric 1050T numerical control. Automatic compensation of part geometry for tool wear during the cutting and chip-forming operation was controlled by software in the 1050T numerical control. Digital wear information was received by the 1050T control from an analog-to-digital converter which was driven by the analog output of the Edmunds air gage (FIG. 6). The A/D converter was a model ADC-71C board which is an optional plug-in board for the General Electric 1050T numerical control. This is a 10-bit board with several voltage ranges; the ±5 volts range was used. With the air gap data thus digitally available to the numerical control, the wear control logic itself can be considered.

Table 1 shows the operator commands necessary to initiate continuous closed loop machining (CCLM), applied specifically in this case to automatic tool wear compensation.

TABLE 1

Commands for Operator Execution of
CCLM Automatic Tool Wear Compensation

| I | G01 Commands Execution of Linear Motion | X01.000 Wipes out Previous Information and Orders X-Axis to Position Itself to Take Initial Zero Wear Data and Subsequent Wear Offsets | M68 Triggers to Initiate System for Automatic Tool Wear Compensation | |
|---|---|---|---|---|
| II | G01 Commands Execution of Linear Motion | Z10.000 Commands Length of Cut (10 inches) | M67 Triggers Wear Compensation Executive Software As Well As Tool Breakage Failsafe | V3000 Frequency of Compensation (3000 milliseconds) |
| III | M69 Will Display Total Wear | | | |

TABLE 1-continued

Commands for Operator Execution of
CCLM Automatic Tool Wear Compensation

Compensation
For 10 Seconds
at The End of
the Run

From the table it will be noticed that three steps are necessary. The first command initializes the system and orders it to position itself to take initial zero wear data and subsequent wear offsets. The second triggers CCLM itself for a straight cut. It is broken into four subcommands. The first two of these (G01 and Z10.000) command a straight cut of 25.4 cm (10 inches) length. The third (M67) commands tool wear compensation, and the fourth (V3000) orders the time interval between compensation steps. This interval equals the delay between the time when a point on the part is cut and when it is inspected by the trailing air nozzle. More will be said later regarding this interval. Finally, the third command displays the total tool wear for 10 seconds after the completion of the run. It will be noticed that a different M-code is used in each of the commands. The most significant of these is the M67 which triggers the necessary logic for tool wear compensation. This brief software summary concentrates on the M67 and the software it controls.

Figure 12:
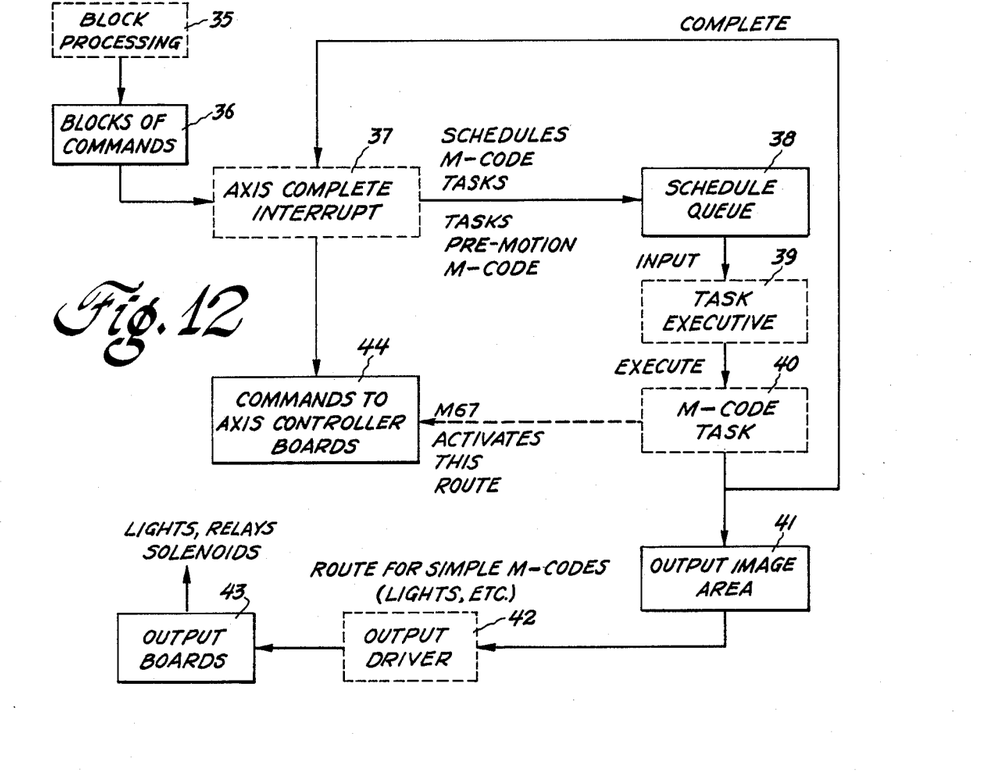
FIG. 12 shows diagrammatically the continuous closed loop machining software.

FIG. 12 shows how typical M-mode command is processed through a General Electric 1050T numerical control. It also shows the special features of continuous closed loop machining (CCLM). Block Processing (35) sends processed command blocks (36) to the Axis Complete Interrupt (37), which schedules M-code tasks, both pre-motion and post-motion and sends them to the schedule queue (38). These commands become input to Task Executive (39) which executes the M-code Task (40).

From Task Executive, the normal routing for a simple M-code Task is through the Output Image Area (41) and driver (42) to the Output Boards (43), which trigger lights, relays, solenoids, etc. This normal path for simple M-codes is shown in the lower line of the figure. The complex M-code, (M67), for automatic tool wear compensation is handled differently.

The CCLM software is housed in Task Executive. This software calculates the offsets needed for automatic tool wear compensation. But instead of sending the resulting information to the Axis Controller Boards (44) via the normal routing along the "complete" path back to Axis Complete Interrupt, the special feature of the CCLM software is that the M67 activates a direct route from Task Executive to the Axis Controller Boards. Thus, the response is prompt. The details of the CCLM software triggered and terminated by the M67 are shown in Tables 2 and 3. Table 2 illustrates the initial logic steps performed by this software, while Table 3 shows subsequent steps.

TABLE 2

CCLM Tool Wear Compensation Logic

| Triggered By | Terminated By |
|---|---|
| M67 Pre-Motion | M67 Post-Motion |
| CCLM Compensation Logic | |

Initial Logic Steps:
Delay 3 Seconds (Programmable)

TABLE 2-continued
CCLM Tool Wear Compensation Logic and Check for Termination
Initial Interval
Get A/D Converted Voltage from Air Gage
Compare Voltage to Pre-Constructed Table of
  Air Gap Versus Gage Voltage
Establish Initial Air Gap = Initial Value
  For Next Interval

TABLE 3
CCLM Tool Wear Compensation Logic

Triggered By      Terminated By
M67 Pre-Motion      M67 Post-Motion
↓      ↓
CCLM Compensation Logic Subsequent Logic Steps:
Subsequent 3 Second Intervals
Get A/D Signal
Convert Signal to Table Index
Pick-up New Air Gap
If New < Old Calculate Compensation = Old − New
If Compensation > Maximum Allowable Apply E-Stop
Perform CCLM Adjustment by Sending Adjustment
  Command to Axis Controller Directly
Current Tool Wear = Tool Wear on Last
  Interval + Compensation
Old Value = New Value
End If Following the initial logic steps, the first operation performed by the software is a time delay and check for termination of CCLM. The time delay is basically the time required for the tool to advance the distance between its trailing edge and the back of the air nozzle. The reason for the delay has been explained before. It is most easily understood for the initial step by considering the start of a cut. When the tool starts to cut, the trailing air gage is still off the work. Then, after the tool proceeds the distance of the lag, the nozzle moves onto the end of the work. After the nozzle completely covers the end of the work, it measures the initial gap associated with an unworn tool. The time delay assures that the gap is not measured until the nozzle is fully onto the work. FIG. 11 illustrates how the nozzle trails the tool tip. The software responds to this initial gap by getting the A/D converted air gage signal, comparing it to the pre-programmed table of air gap vs. this signal and putting the resulting value in memory. The memorized value thus obtained is the initial air gap and it equals the comparison value for the next interval. It represents the gap for an unworn tool. The logic steps for the next and subsequent intervals are illustrated in Table 3. In each case, they are performed following the programmed time delay, thus assuring that the surface machined following any tool position change is observed by the air gage before another change is made. According to the information in Table 3, the first step in subsequent intervals is to get the A/D converted air gage signal, and using the table, convert it into a new air gap for that interval. If the new gap is less than the gap for the previous interval, the tool tip has worn by an amount equal to the changes, and a step in-feed equal to the difference is needed to bring the tool tip back to its programmed position. This compensation, in tenths of mils, is fed directly to the axis control boards through the path initiated by the M67 (see FIG. 12) and the new air gap is put in memory. This process is continued until the total offset reaches a predetermined value which indicates the tool is worn out or until some failsafe in the software recognizes a problem and signals an E-stop. In the initial software, an E-stop is triggered if the calculated wear compensation exceeds some preset maximum indicating tool breakage. Following the sequence of steps shown in Table 3, an "End If" recycles the logic. It is restarted by getting the A/D converted signal following the programmed time delay; the logic steps are then retraced and the next compensation made.

Figure 8:
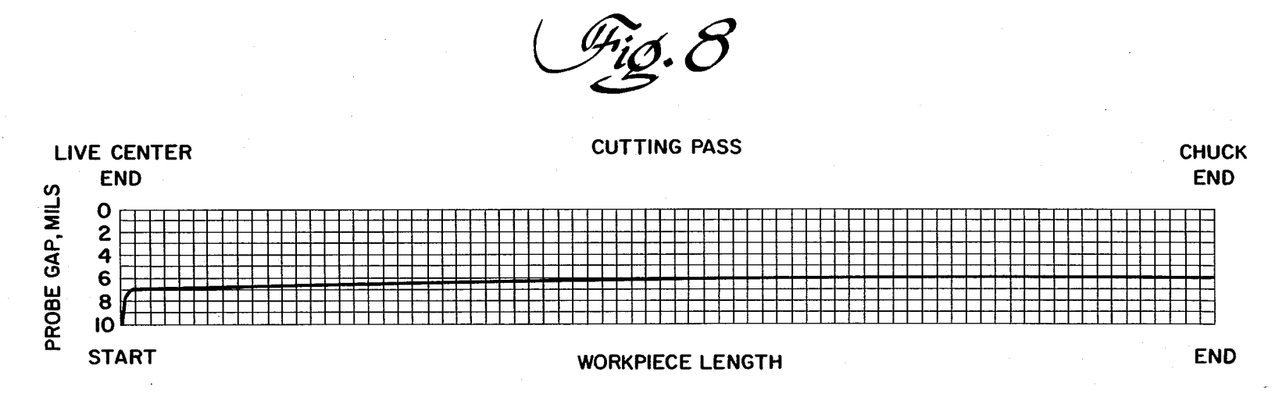
FIG. 8 shows the probe signal recorded during a cutting pass and a small amount of tool wear.
Figure 9:
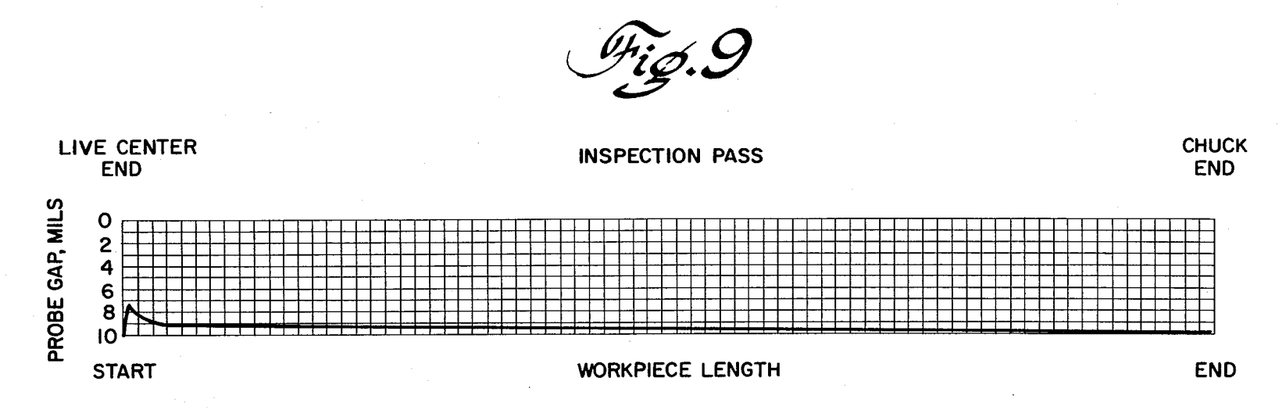
FIG. 9 shows the probe signal recorded during the inspection pass and the error due to flexibility of the live center end.

FIG. 8 shows the probe signal recorded during a cutting pass which demonstrated the air gage displacement sensor. The workpiece was 347 stainless steel, the workpiece diameter was 3.5 inches, the depth of cut was 15 mils, and the tool material was 370 carbide. The chart shows total tool wear of approximately 1.1 mil. The tool wears quickly at first, then more uniformly; near the start the probe gap, i.e. the sensed distance from the probe face to the workpiece, is 7.2 mils and at the end of the pass the gap is 6.1 mils. It is noted on the chart that the start is at the live center end of the workpiece and the finish is at the chuck end. At the live center end there is more deflection away from the tool and the tool doesn't cut as deeply and leaves a larger diameter. The probe signal taken during an out-of-contact inspection pass, FIG. 9, shows a 4.8 mil diameter error due to flexibility of the live center end. The probe gap is initially 7.4 mils and at the finish is 9.8 mils, as change of 2.4 mils on the radius and 4.8 mils on the diameter. Machine deflections can appear in many forms; here there is a live center that results in a deflection at one end.

The tool wear is easy to detect by hand gaging, but the part error resulting from deflection of the workpiece is a fourth order type error and would be difficult to measure by hand gaging. The present in-process inspection technique, however, makes it possible to measure the error at many points and change the part program correspondingly for the second cutting pass and as many subsequent cutting passes as are needed. Based on the part error the part program is automatically modified to remachine the part to desired ultimate shape. The workpiece is remachined using the modified part program and reinspected, and this procedure is continued iteratively with each iteration yielding a more accurate profile until the desired part shape is reached.

Referring to FIG. 10, an operator controlled machine tool is provided with the in-process tool condition compensation and part inspection system. The probe signal continuously generated by displacement sensor 14 is digitized and fed to the wear signal circuit 18, broken tool logic 19, and worn-out tool logic 20. A meter 32 or other device displays to the operator the amount of wear who stops the machine, adjusts the cutting tool manually, and restarts the machine. A broken tool or worn-out tool output signal operates an audible alarm 33 or a warning light to signal the operator who stops the machine tool and replaces the cutting insert 11. Some simple part shapes may be inspected automatically by the device. The cutting tool 11 is retracted a short distance away from the workpiece 13 and the tool path is retraced. The part error from inspection logic 21 is displayed to the operator who takes any needed corrective action.

While the invention has been particularly shown and described with reference to preferred embodiments thereof, it will be understood by those skilled in the art that various changes in form and details may be made therein without departing from the spirit and scope of the invention.

What is claimed is:

1. An in-process method of monitoring and compensating for the condition of a cutting tool on a numerically controlled machine tool which has a cutting tool-tool holder assembly that follows a part program, comprising:

mounting a displacement sensor on said cutting tool-tool holder assembly and continuously measuring the distance to a freshly cut surface on a workpiece during a cutting and chip-forming operation while executing the part program, and generating a probe signal representing sensed distance;

processing said probe signal to produce cutting tool condition signals including a wear signal that indicates the amount of tool wear perpendicular to the workpiece axis; and adjusting the location of the point of said cutting tool during the cutting and chip-forming operation to compensate for tool wear, the updated tool path being given by the part program plus the change in sensed distance.

2. The method of claim 1 wherein said displacement sensor is an air gage device which has an output voltage proportional to distance.

3. The method of claim 2 wherein said probe signal is processed to provide a broken tool signal indicated by an abrupt change in sensed distance, and stopping said machine tool.

4. The method of claim 3 wherein said probe signal is processed to provide a worn-out tool signal indicating that wear exceeds prescribed limits, and stopping said machine tool.

5. The method of claim 1 wherein said displacement sensor is an air flushed capacitance gage.

6. The method of claim 1 and the steps of retracting said cutting tool-tool holder assembly and sensor a short distance away from the workpiece, re-executing the part program while continuously generating a probe signal representing distance to the machined workpiece, processing said probe signal to yield the part error, and remachining the reinspecting said workpiece.

* * * * *